United States Patent
Yang et al.

(10) Patent No.: US 11,451,645 B2
(45) Date of Patent: Sep. 20, 2022

(54) AUTOMATIC DATA REPLICA MANAGER IN DISTRIBUTED CACHING AND DATA PROCESSING SYSTEMS

(71) Applicant: Samsung Electronics Co., Ltd., Suwon-si (KR)

(72) Inventors: Zhengyu Yang, San Diego, CA (US); Jiayin Wang, Dorchester, MA (US); Thomas David Evans, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 16/569,176

(22) Filed: Sep. 12, 2019

(65) Prior Publication Data
US 2020/0028932 A1    Jan. 23, 2020

Related U.S. Application Data

(62) Division of application No. 15/408,328, filed on Jan. 17, 2017, now Pat. No. 10,455,045.

(60) Provisional application No. 62/404,167, filed on Oct. 4, 2016, provisional application No. 62/384,078, filed on Sep. 6, 2016.

(51) Int. Cl.
| | |
|---|---|
| *H04L 41/0668* | (2022.01) |
| *H04L 67/568* | (2022.01) |
| *H04L 41/5022* | (2022.01) |
| *H04L 43/0852* | (2022.01) |
| *H04L 43/0888* | (2022.01) |
| *H04L 41/5025* | (2022.01) |

(Continued)

(52) U.S. Cl.
CPC ........ *H04L 67/568* (2022.05); *H04L 41/0668* (2013.01); *H04L 41/5009* (2013.01); *H04L 41/5022* (2013.01); *H04L 41/5025* (2013.01); *H04L 43/0852* (2013.01); *H04L 43/0888* (2013.01); *H04L 43/16* (2013.01); *H04L 67/1001* (2022.05); *H04L 67/1095* (2013.01)

(58) Field of Classification Search
CPC ............ H04L 41/0668; H04L 41/5009; H04L 41/5022; G06F 2212/214; G06F 2212/222
See application file for complete search history.

(56) References Cited

U.S. PATENT DOCUMENTS

| | | |
|---|---|---|
| 5,627,990 A | 5/1997 | Cord et al. |
| 5,768,594 A | 6/1998 | Blelloch et al. |

(Continued)

FOREIGN PATENT DOCUMENTS

| | | |
|---|---|---|
| CN | 103955436 A | 7/2014 |
| CN | 102467452 B | 8/2014 |

(Continued)

OTHER PUBLICATIONS

A Stochastic Memoizer for Sequence Data by Wood; International Conference on Machine Learning, Montreal, Canada, 2009.

(Continued)

*Primary Examiner* — Kamini B Patel

(74) *Attorney, Agent, or Firm* — Lewis Roca Rothgerber Christie LLP

(57) ABSTRACT

A method of data storage includes determining a latency distance from a primary node to each of two or more replica nodes, choosing a preferred replica node of the two or more replica nodes based on the determined latency distances, and write-caching data into the preferred replica node.

9 Claims, 4 Drawing Sheets

(51) Int. Cl.
*H04L 67/1095* (2022.01)
*H04L 43/16* (2022.01)
*H04L 41/5009* (2022.01)
*H04L 67/1001* (2022.01)

(56) References Cited

U.S. PATENT DOCUMENTS

| | | | |
|---|---|---|---|
| 6,519,756 | B1 | 2/2003 | Kao et al. |
| 6,553,394 | B1 | 4/2003 | Perry et al. |
| 6,609,088 | B1 | 8/2003 | Wuytack et al. |
| 7,076,640 | B2 | 7/2006 | Kadambi |
| 7,194,587 | B2 | 3/2007 | McCalpin et al. |
| 7,680,969 | B1* | 3/2010 | Danilak ............... G06F 3/0611 710/74 |
| 8,140,751 | B1 | 3/2012 | Wang |
| 8,190,595 | B2 | 5/2012 | Bruno et al. |
| 8,417,872 | B2 | 4/2013 | Bae et al. |
| 8,463,825 | B1 | 6/2013 | Harty et al. |
| 8,468,299 | B2 | 6/2013 | O'Rourke et al. |
| 8,495,178 | B1 | 7/2013 | Jia et al. |
| 8,762,664 | B2* | 6/2014 | Surtani ............... G06F 11/2097 711/162 |
| 8,874,848 | B2 | 10/2014 | Soundararajan et al. |
| 8,918,362 | B2 | 12/2014 | Calder et al. |
| 8,924,978 | B2 | 12/2014 | Meng et al. |
| 8,953,602 | B2 | 2/2015 | Yang et al. |
| 8,959,519 | B2 | 2/2015 | Agarwal et al. |
| 8,959,524 | B2 | 2/2015 | Hirsch et al. |
| 9,002,939 | B2 | 4/2015 | Laden et al. |
| 9,053,167 | B1 | 6/2015 | Swift et al. |
| 9,081,826 | B2 | 7/2015 | Murthy et al. |
| 9,116,913 | B2 | 8/2015 | Fukatani et al. |
| 9,182,927 | B2 | 11/2015 | Liu et al. |
| 9,189,410 | B2 | 11/2015 | Luo et al. |
| 9,201,891 | B2 | 12/2015 | Romanski et al. |
| 9,213,721 | B1 | 12/2015 | Faibish et al. |
| 9,256,374 | B1 | 2/2016 | Aron et al. |
| 9,280,300 | B2 | 3/2016 | Liu et al. |
| 9,304,997 | B2 | 4/2016 | Beard et al. |
| 9,323,462 | B2 | 4/2016 | Olson et al. |
| 9,330,108 | B2 | 5/2016 | Jones et al. |
| 9,342,390 | B2 | 5/2016 | Chen et al. |
| 9,348,707 | B2 | 5/2016 | Kashyap et al. |
| 9,361,047 | B2 | 6/2016 | Biederman et al. |
| 9,372,630 | B2 | 6/2016 | Guo et al. |
| 9,513,814 | B1 | 12/2016 | Can et al. |
| 9,612,967 | B1* | 4/2017 | Peterson ............. G06F 12/0806 |
| 9,817,766 | B1 | 11/2017 | Si et al. |
| 9,858,191 | B2 | 1/2018 | Choi et al. |
| 10,048,996 | B1 | 8/2018 | Bell et al. |
| 10,455,045 | B2* | 10/2019 | Yang ............... H04L 43/0888 |
| 2002/0035605 | A1 | 3/2002 | McDowell et al. |
| 2003/0109940 | A1 | 6/2003 | Guntzer et al. |
| 2004/0148470 | A1* | 7/2004 | Schulz ............... G06F 12/0862 711/137 |
| 2004/0193952 | A1 | 9/2004 | Narayanan et al. |
| 2005/0010629 | A1 | 1/2005 | Hess et al. |
| 2005/0086384 | A1 | 4/2005 | Ernst |
| 2006/0026154 | A1 | 2/2006 | Altinel et al. |
| 2006/0112219 | A1 | 5/2006 | Chawla et al. |
| 2006/0253674 | A1 | 11/2006 | Zohar et al. |
| 2007/0033659 | A1 | 2/2007 | Hoche et al. |
| 2008/0126547 | A1 | 5/2008 | Waldspurger |
| 2009/0006593 | A1* | 1/2009 | Cortes ............... H04L 12/66 709/223 |
| 2009/0049421 | A1 | 2/2009 | Meijer et al. |
| 2009/0276657 | A1 | 11/2009 | Wetmore et al. |
| 2009/0288084 | A1 | 11/2009 | Astete et al. |
| 2010/0131545 | A1* | 5/2010 | Srivastava ........... G06F 16/27 707/769 |
| 2010/0281078 | A1 | 11/2010 | Wang et al. |
| 2011/0035548 | A1 | 2/2011 | Kimmel et al. |
| 2011/0246491 | A1* | 10/2011 | Clash ............... G06F 3/0604 707/755 |
| 2011/0302371 | A1 | 12/2011 | Lysko |
| 2012/0268471 | A1 | 10/2012 | Khalvati et al. |
| 2013/0055290 | A1 | 2/2013 | Gaikwad et al. |
| 2013/0073523 | A1 | 3/2013 | Gounares et al. |
| 2013/0074057 | A1 | 3/2013 | Gounares et al. |
| 2013/0124916 | A1* | 5/2013 | Shutt ............... G06F 16/27 714/6.3 |
| 2013/0179630 | A1 | 7/2013 | Yano et al. |
| 2013/0232382 | A1 | 9/2013 | Jain et al. |
| 2013/0263142 | A1* | 10/2013 | Miyamae ............. G06F 9/5033 718/102 |
| 2013/0290249 | A1 | 10/2013 | Merriman et al. |
| 2013/0297902 | A1 | 11/2013 | Collins et al. |
| 2013/0346366 | A1* | 12/2013 | Ananthanarayanan ............... G06F 16/273 707/611 |
| 2014/0149637 | A1 | 5/2014 | Gu et al. |
| 2014/0164687 | A1 | 6/2014 | Kwon et al. |
| 2014/0207955 | A1 | 7/2014 | Musial et al. |
| 2014/0324785 | A1 | 10/2014 | Gupta et al. |
| 2015/0006788 | A1 | 1/2015 | Liu et al. |
| 2015/0074350 | A1 | 3/2015 | Chiang et al. |
| 2015/0127646 | A1 | 5/2015 | Shaw |
| 2015/0188840 | A1 | 7/2015 | Xiao et al. |
| 2015/0234617 | A1 | 8/2015 | Li et al. |
| 2015/0234719 | A1* | 8/2015 | Coronado ............. G06F 3/0683 714/6.3 |
| 2015/0254322 | A1 | 9/2015 | Ma et al. |
| 2015/0288669 | A1 | 10/2015 | Litoiu et al. |
| 2015/0333994 | A1 | 11/2015 | Gell et al. |
| 2015/0347451 | A1 | 12/2015 | Lee et al. |
| 2016/0011876 | A1 | 1/2016 | Mukherjee et al. |
| 2016/0019286 | A1 | 1/2016 | Bach et al. |
| 2016/0132433 | A1 | 5/2016 | Hayashi et al. |
| 2016/0170882 | A1* | 6/2016 | Choi ............... G06F 3/06 711/119 |
| 2016/0188490 | A1 | 6/2016 | Samih |
| 2016/0188898 | A1 | 6/2016 | Karinta et al. |
| 2016/0291942 | A1 | 10/2016 | Hutchison |
| 2016/0292053 | A1 | 10/2016 | Antony et al. |
| 2017/0091107 | A1* | 3/2017 | Peterson ............. G06F 12/084 |
| 2017/0134337 | A1 | 5/2017 | Araújo |
| 2017/0142217 | A1 | 5/2017 | Misra et al. |
| 2017/0242958 | A1 | 8/2017 | Brown |
| 2017/0244784 | A1 | 8/2017 | Lam et al. |
| 2017/0318091 | A1 | 11/2017 | Ke et al. |
| 2017/0371540 | A1* | 12/2017 | Ding ............... G06F 3/067 |
| 2018/0025052 | A1* | 1/2018 | Nambiar ............. G06F 16/2453 707/713 |
| 2018/0025092 | A1 | 1/2018 | Aharonov et al. |
| 2018/0048712 | A1 | 2/2018 | Sarisky et al. |
| 2018/0060237 | A1 | 3/2018 | Leslie-Hurd et al. |
| 2018/0069944 | A1* | 3/2018 | Yang ............... H04L 67/1095 |
| 2019/0163371 | A1* | 5/2019 | Nambiar ............. G06F 3/0608 |

FOREIGN PATENT DOCUMENTS

| | | |
|---|---|---|
| JP | 5478526 B2 | 4/2014 |
| KR | 10-2010-0014782 A | 2/2010 |
| KR | 10-2013-0122326 A | 11/2013 |
| KR | 10-2015-0037985 A | 4/2015 |
| KR | 10-2015-0093979 A | 8/2015 |
| KR | 10-2015-0095978 A | 8/2015 |
| KR | 10-2015-0104585 A | 9/2015 |
| KR | 10-2016-0081815 A | 7/2016 |
| WO | 03/067426 A1 | 8/2003 |
| WO | WO 2013/024952 A1 | 2/2013 |

OTHER PUBLICATIONS

Apache Sparks: "core concepts, architecture and internals," http://datastrophic.io/core-concepts-architecture-and-internals-of-apache-spark/, Mar. 3, 2016 on Spark (17 pages).

Bocchino Parallel Programming Must Be Deterministic by Default U of Illinois 2009. (Year: 2009).

Bu et al., "HaLoop: Efficient Iterative Data Processing on Large Clusters", Proc. of the VLDB, vol. 3, No. 1-2, DOI: 10.14778/1920841.1920881, Sep. 30, 2010, pp. 285-296.

(56) References Cited

OTHER PUBLICATIONS

Chiang et al., "An Adaptive IO Prefetching Approach for Virtualized Data Centers," IEEE 2015, 14 pages.
Dean, Jeffrey et al., "MapReduce: Simplified Data Processing on Large Clusters", Communications of the ACM, Jan. 2008, vol. 51, No. 1 (pp. 107-113).
Ding, Chen, et al., "Predicting Whole-Program Locality through Reuse Distance Analysis," SIGPLAN Notices, 2003, pp. 245-257.
Etheredge Pure and Deterministic Functions (Year: 2008).
Hellerstein Query Execution Techniques for Caching Expensive Methods, 1996. (Year: 1996).
Intercepting Functions for Memoization: A Case Study Using Transcendental Functions by Suresh (Year: 2015).
Kanninnura A Speed-up Technique for an Auto Memoization Processor by Reusing Partial Results of Instruction Regions (Year: 2012).
Kathpal Analyzing Compute vs. Storage Tradeoff for Video aware Storage Efficiency (Year: 2012).
Khanafer The Constrained Ski-Rental Problem and its Application to Online Cloud Cost Optimization (Year: 2013).
Lecture 18: Dynamic Programming I: Memoization, Fibonacci, Crazy Eights; MIT, Dept of Computer Science and AI; Fall 2009; Available at http://courses.csail.nnitedu/6.006/fal109/lecture notes/lecture18.pdf (Year: 2009).
Liu, Deng, et al., "VFRM: Flash Resource Manager in VMware ESX Server," IEEE Network Operations and Management Symposium (NOMS), 2014, 7 pages.
Liu, Yi et al., "SSD as a Cloud Cache? Carefully Design about It", Shenzhen Institutes of Advanced Technology, Chinese Academy of Sciences, Shenzhen 518055, P.R. China; Department of Computer Science, University of Minnesota, Twin Cities, USA; Shenzhen College of Advanced Technology, University of Chinese Academy of Sciences, Shenzhen 518055, P.R. China, Journal of Computers, vol. 27, No. 1, Apr. 2015 (pp. 26-37).
Luo, Tian et al., "S-CAVE: Effective SSD Caching to Improve Virtual Machine Storage Performance", Proceeding, PACT '13 Proceedings of the 22nd international conference on Parallel architectures and compilation techniques, pp. 103-112, Edinburg, Scotland, UK, Oct. 7, 2013, (10 pages).
Ma Way Memoization to Reduce Fetch Energy in Instruction Caches MIT, 2001. (Year: 2001).
Mayfield Using Automatic Memoization as a Software Engineering Tool in Real World AI Systems (Year: 1995).
Meng, Fei, et al., "vCacheShare: Automated Server Flash Cache Space Management in a Virtualization Environment," USENIX Annual Technical Conference, 2014, pp. 133-144.
Rajasekaran, Sundaresan, "Multi-Cache: Dynamic, Efficient Partitioning for Multi-Tier Caches in Consolidated VM Environments", IEEE International Conference on Cloud Engineering, 2016, Date Added to IEEE Xplore: Jun. 2, 2016, (10 pages).
Ren, Jen, "I-CASH: Intelligently Coupled Array of SSD and HDD", IEEE 17th International Symposium on High Performance Computer Architecture, 2011, Date Added to IEEE Xplore: Apr. 15, 2011, (12 pages).
"Spark Programming Guide," *Apache Spark, Version 2.1.0.*, Released on Dec. 2016, https://spark.apache.org/docs/latest/programming-guide.html#rdd-operations.
Spark Trademark Evidence (Year: 2018).
Tai, Jianzhe, et al., "Improving Flash Resource Utilization at Minimal Management Cost in Virtualized Flash-based Storage Systems," IEEE Transactions on Cloud Computing, 2015, 15 pages.
Toffola Performance Problems You Can Fix A Dynamic Analysis of Memoization Opportunities 2015 (Year: 2015).
U.S. Advisory Action dated Oct. 29, 2018, issued in U.S. Appl. No. 15/404,100 (8 pages).
U.S. Notice of Allowance dated Dec. 31, 2018, issued in U.S. Appl. No. 15/404,100 (12 pages).
U.S. Office Action dated Apr. 11, 2018, issued in U.S. Appl. No. 15/404,100 (24 pages).
U.S. Office Action dated Apr. 11, 2018, issued in U.S. Appl. No. 15/404,121 (31 pages).
U.S. Office Action dated Apr. 19, 2018, issued in U.S. Appl. No. 15/423,384 (20 pages).
U.S. Office Action dated Aug. 10, 2018, issued in U.S. Appl. No. 15/400,835, 16 pages.
U.S. Final Office Action dated Feb. 7, 2019, issued in U.S. Appl. No. 15/400,835 (12 pages).
Venugopal, et al., A Taxonomy of Data Grids for Distributed Data Sharing, Management and Processing, ACM CSUR, vol. 38, No. 1, DOI: 10.1145/1132952.1132955, Jun. 29, 2006, pp. 1-46.
Wang, et al., "A New Scheme for Cache Optimization Based on Cluster Computing Framework Spark", 2015 8th International Symposium on Computational Intelligence and Design (ISCID). vol. 1. IEEE, 2015, pp. 114-117.
Xu, Zhou, et al. "A Dynamic Distributed Replica Management Mechanism Based on Accessing Frequency Detecting," Operating Systems Review (ACM), vol. 38, No. 3, 2004, pp. 26-34; DOI: 10.1145/1035834.1035838.
Zaharia, Matei et al., "Spark: Cluster Computing with Working Sets", University of California, Berkeley, HotCloud 10 (2010): 10-10, (pp. 1-7).
Ziarek Partial Memoization of Concurrency and Communication (Year: 2009).

* cited by examiner

AUTOMATIC DATA REPLICA MANAGER IN DISTRIBUTED CACHING AND DATA PROCESSING SYSTEMS

CROSS-REFERENCE TO RELATED APPLICATION(S)

This application is a divisional of U.S. patent application Ser. No. 15/408,328, filed Jan. 17, 2017, which claims priority to, and the benefit of, U.S. Provisional Application 62/404,167, filed on Oct. 4, 2016 and U.S. Provisional Application No. 62/384,078, filed on Sep. 6, 2016, in the U.S. Patent and Trademark Office, the entire contents of each of which are incorporated herein by reference.

FIELD

One or more aspects of embodiments according to the present invention generally relate to datacenter operation including data storage and data recovery.

BACKGROUND

In the field of memory storage, datacenters that store large amounts of memory seek to accomplish high capacity, high performance, low power usage, and low cost.

Replication is the process of synchronizing data across multiple storage nodes of a datacenter cluster, which provides redundancy, and which increases data availability from the loss of a single storage node. Replication allows the system to recover from hardware failure and service interruptions, and even to increase read capacity. Thus, in an era of big data and cloud computing, storing multiple replicas (e.g., replicated data sets) is a common strategy for reliability and availability of datasets stored over remote cloud storage.

Additionally, certain databases, such as bank, stock market, and military databases, require that the data stored therein is replicable and is reliably stored.

SUMMARY

Aspects of embodiments of the present disclosure are directed toward datacenter operation, including data storage and data recovery.

According to an embodiment of the present invention, there is provided a method of data storage, the method including determining a latency distance from a primary node to each of two or more replica nodes, choosing a preferred replica node of the two or more replica nodes based on the determined latency distances, and write-caching data into the preferred replica node.

The two or more replica nodes may each have a smaller latency distance to the primary node than all other available nodes of a datacenter cluster including the primary node and the two or more replica nodes.

Each node of a datacenter cluster as a primary node may have a ranking of preferred replica nodes that are ranked based on network delays associated with paths between the primary node and respective ones of the replica nodes, and each node of the datacenter cluster may include a solid-state drive tier as a cache tier including a cache partition for storing data of local virtual machines and a replica partition for storing replica data from other nodes, and a hard disk drive tier as a back end storage tier.

Each node may include a physical host for running multiple virtual machines, each of the virtual machines sharing the solid-state drive tier and the hard disk drive tier in a respective node of the datacenter cluster, the method further including periodically updating the rankings of the preferred replica nodes to account for changes in network delays.

The rankings of the preferred replica nodes may be further based on workload characteristics including access frequency of data associated with the nodes and service level agreements (SLAs) associated with the nodes.

According to another embodiment of the present invention, there is provided a method for enabling fault tolerance of a datacenter cluster caching system, the method including detecting a failure of the datacenter cluster, and performing load balancing among nodes of the datacenter cluster in accordance with the detected failure by moving data among storage tiers of the nodes, wherein the load balancing is performed without pausing a subsystem corresponding to the detected failure, and without copying an entirety of a dataset of a node of the datacenter cluster corresponding to the detected failure.

The method may further include migrating replica data from a first replica node in the datacenter cluster to a second replica node in a datacenter cluster by writing new incoming data on the second replica node, and maintaining unchanged cached data on the first replica node.

The method may further include evicting victim data from a solid-state drive of a primary node, receiving the new incoming data at the primary node, writing the new incoming data to a hard disk drive of the primary node, and removing the victim data from a solid-state drive of the first replica node.

The detected failure may include a virtual machine crash on a primary node of the datacenter cluster, and the method may further include writing dirty data from a solid-state drive of the primary node to a hard disk drive of the primary node, maintaining the dirty data in a solid-state drive of a replica node, flagging the dirty data in the solid-state drive of the replica node as nondirty, restarting the crashed virtual machine on the primary node, and forwarding incoming I/O requests to the solid-state drive of the primary node and to the solid-state drive of the replica node.

The detected failure may include a cache device failure on a primary node of the datacenter cluster such that information cannot be written to the primary node, and the method may further include writing dirty data from a solid-state drive of a replica node of the datacenter cluster to a hard disk drive of the primary node, maintaining the dirty data in the solid-state drive of the replica node, flagging the dirty data as nondirty, broadcasting the information to associated nodes of the datacenter cluster, and writing back dirty data from respective solid-state drives of the associated nodes of the datacenter cluster to respective hard disk drives of the associated nodes.

The method may further include flagging data in the solid-state drives of the associated nodes with a nondirty flag, replacing the solid-state drive on the primary node, continuing to write incoming I/O requests to the solid-state drive of the primary node and the solid-state drive of the replica node, and writing new replica data from the associated nodes to the solid-state drive of the primary node.

The detected failure may include a cache device failure on a first replica node of the datacenter cluster, and the method may further include disconnecting a primary node of the datacenter cluster, writing back dirty data from a solid-state drive of the primary node to a hard disk drive of the primary node, finding a remote second replica node of the datacenter cluster, storing the dirty data in a solid-state drive of the second replica node, flagging the dirty data in the solid-state drive of the second replica node as nondirty, and continuing to write incoming I/O requests to the solid-state drive of the primary node and the solid-state drive of the second replica node.

Finding a remote second replica node of the datacenter cluster may include using a dynamic evaluation process.

The detected failure may include a communication failure between a primary node of the datacenter cluster and a first replica node of the datacenter cluster, and the method may further include writing back dirty data from a solid-state drive of the primary node to a hard disk drive of the primary node, finding a second replica node to replace the first replica node, writing I/O requests to a solid-state drive of the primary node and a solid-state drive of the second replica node, and broadcasting to all nodes of the datacenter cluster a request to release all old replica data corresponding to the first replica node.

Finding the second replica node may include using a dynamic evaluation process.

According to another embodiment of the present invention, there is provided a method of using replicated data to enable parallel prefetching from multiple nodes of a datacenter cluster, the method including splitting a dataset into two parts, and loading each of the two parts of the dataset from a corresponding node.

The corresponding nodes for each of the two parts of the dataset may include a primary node of the datacenter cluster, and a replica node of the datacenter cluster.

C may be a total size of the dataset, $\alpha C$ may be a size of the one of the two parts from a solid-state drive of the primary node, $\lambda_1$ may be an access speed of the solid-state drive of the primary node, and $\lambda_2$ may be an access speed of a solid-state drive of the replica node, and the method may further include triggering parallel prefetching when $C/\lambda_1$ is greater than or equal to a maximum of $\alpha C/\lambda_1$ and $(1-\alpha)C/\lambda_2$.

$\lambda_1$ and $\lambda_2$ may each account for corresponding network delays.

The method may further include achieving a network makespan of $$\frac{C}{\lambda_1 + \lambda_2}$$

when $$\alpha = \frac{\lambda_1}{\lambda_1 + \lambda_2}.$$

DETAILED DESCRIPTION

Figure 1:
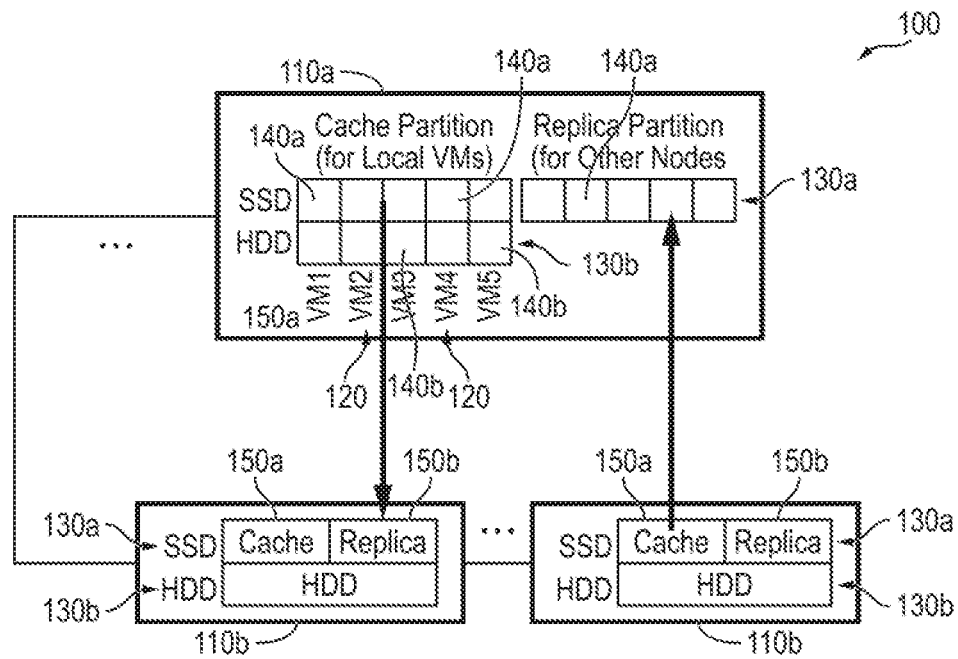
FIG. 1 is a block diagram depicting a topological structure of a datacenter cluster, according to an embodiment of the present invention.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to,"

or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram depicting a topological structure of a datacenter cluster, according to an embodiment of the present invention.

Referring to FIG. 1, a datacenter cluster 100 includes multiple nodes 110 arranged in a cluster. Each node 110 may be a physical host (e.g., a server) running multiple virtual machines (VMs) 120. The VMs 120 may be run on either a type-1 hypervisor or a type-2 hypervisor. For example, the host used to run the VMs 120 in the present embodiment is a type-1 implementation (e.g., the present embodiment may use ESXi hosts for each node 110).

Inside each node 110, there may be two tiers 130 of data storage devices/memory devices 140. The two storage tiers 130 may include a solid-state drive (SSD) tier 130a, and a hard disk drive (HDD) tier 130b. It should be noted that, although SSDs and HDDs are used to describe the various embodiments below, other embodiments may use different cache/tier devices and/or memory devices.

Each storage tier 130 includes one or more memory devices 140. For example, the SSD tier 130a may include one or more SSDs 140a, and the HDD tier 130b may include one or more HDDs 140b. RAID mode disks (e.g., disks operating as a redundant array of independent disks) can also be adopted in each of the storage tiers 130. VMs 120 share the SSD tier 130a and the HDD tier 130b in each respective node 110. The SSD tier 130a may be used as a cache tier, and the HDD tier 130b may be used as a backend storage tier.

Inside the SSD tier 130a there are two partitions 150. The two partitions 150 include a cache partition 150a, which is for storing data for the local VMs 120, and a replica partition 150b, which is for storing replica data from other nodes 110. In the present embodiment, only the SSD tier 130a is used to store replica data from other nodes 110. This may be suitable because the access speed of a remote SSD 140a, even when network delay is accounted for, may be faster than the access speed of a local HDD 140b (e.g., due to high speed fiber channels associated with the SSDs 140a, and due to slower speed associated with the more durable HDDs 140b).

According to different embodiments of the present invention, different approaches may be used to design the structure of the topology of the datacenter cluster 100. The type of approach that is used may be chosen by determining how to select replica nodes 110, how many replicas nodes 110 are suitable for the constraints of the system, and how to assign replica data to the replica nodes 110.

Figure 2A:
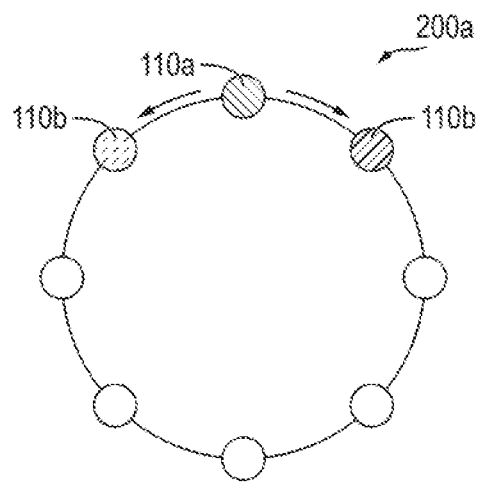
FIG. 2A depicts a method of selecting and assigning replica nodes of a datacenter cluster using a ring structure, according to an embodiment of the present invention.

FIG. 2A depicts a method of selecting and assigning replica nodes of a datacenter cluster using a ring structure, according to an embodiment of the present invention.

Referring to FIG. 2A, a first approach is a directed ring structure 200a, which can be either a user-defined structure or a system-defined structure. The ring structure 200a may be thought of as a linear structure. A system-defined ring structure 200a may be based on geographic "distance" parameters (e.g., a latency distance based on an effective distance corresponding to a total network delay). The logical ring structure 200a shown defines an order of preference between a primary node 110a and replica nodes 110b. Caching may be performed by using a local SSD 140a with a copy replicated to another replica node 110b in the ring structure 200a. Each node 110 has two neighbors (e.g., a replica node 110b on each side of each primary node 110a), and replicated data may be stored on one or both of the neighboring replica nodes 110b. The primary node 110a searches for the replica nodes 110b of the ring structure 200a in order of geographic distance/latency distance until a replica node 110b is found that can be used in the event that the primary node 110a is unsuccessful during the process of building the ring cluster 200a. Once the primary node 110a finds a suitable replica node 110b, the primary node 110a may begin write-caching independently of what the remaining replica nodes 110b are doing.

Figure 2B:
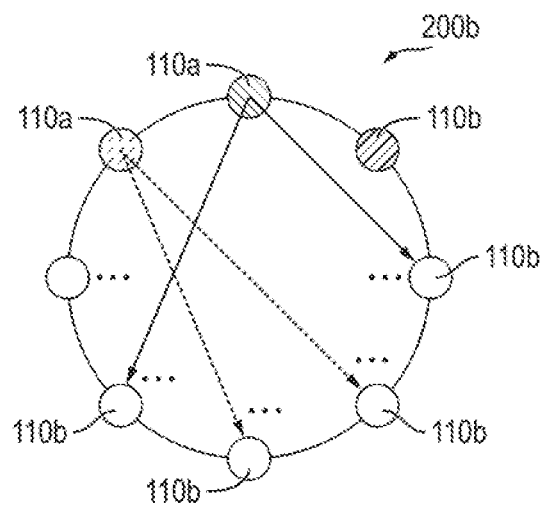
FIG. 2B depicts a method of selecting and assigning replica nodes of a datacenter cluster using a network structure, according to an embodiment of the present invention.

FIG. 2B depicts a method of selecting and assigning replica nodes of a datacenter cluster using a network structure, according to an embodiment of the present invention.

Referring to FIG. 2B, a second approach is directed to a network structure 200b. The ring structure 200a shown in FIG. 2A is effectively a linear approach, because the primary node 110a has only one or two directions to find replica nodes 110b (e.g., a previous replica node 110b or a next replica node 110b). The network structure 200b shown in FIG. 2B, however, provides additional flexibility by allowing for access by the primary node 110a to a larger number of different replica nodes 110b. The additional access may be achieved by letting the different nodes 110 maintain a list of preferred replica nodes 110b. Further, it should be noted that the cluster structure in a network structure 200b is not limited to the ring-like orientation shown. For example, the network structure 200b can be either symmetric or asymmetric.

In structuring the network structure 200b, a distance matrix may be used to rank each path between nodes 110 (see Table 1, below). Accordingly, each node 110 acting as a primary node 110a may attempt to use multiple different replica nodes 110b based on an order corresponding to the distance matrix.

The distance matrix for each node 110, may be thought of as including scores or rankings that are calculated based on multiple parameters (e.g., based on network delays between respective nodes 110). These scores/rankings effectively reflect an abstract meaning of the aforementioned geographical distance/latency distance. The distance matrix may be periodically updated through runtime measurement.

A distance matrix of an example of the present embodiment may be seen in Table 1 below. For example, a first node as a primary node 110a may first seek to use a second node as a replica node 110b, followed by a fourth node, and then a third node. However, the second node, when acting as a primary node 110a, may first seek to use the fourth node as a replica node 110b, followed by the third node, and then the first node. Furthermore, the third node, when acting as a primary node 110a, may initially seek the fourth node, then the second node, and then the first node as a replica node 110b, while the order for the fourth node, when acting as a primary node 110a, may be from the first node to the third node to the second node.

TABLE 1

|      | To  |     |     |     |
| ---- | --- | --- | --- | --- |
| From | 1   | 2   | 3   | 4   |
| 1    | —   | 1   | 3   | 2   |
| 2    | 3   | —   | 2   | 1   |
| 3    | 3   | 2   | —   | 1   |
| 4    | 1   | 3   | 2   | —   |

Different processes may be used for assigning a preferred order of the replica nodes 110b for each node 110 as a primary node 110a. For example, if only one replica node 110b is sufficient for each primary node 110a, then each node 110 may select its "closest" node as its replica node 110b. As another example, if a large number of nodes 110 choose a same single node 110 (or choose a small subset of nodes 110) as the preferred replica node(s) 110b, a maximum number of replica nodes per primary node may be set.

Accordingly, the network structure 200b may be set such that each primary node 110a has only one replica node 110b, and such that all nodes 110 have the same hardware resources (e.g., a homogeneous cluster). However, the network structure 200b may also work in a heterogamous environment.

According to another embodiment, a multiple service-level agreement (SLA) network approach may be used. The multiple-SLA network approach further protects data consistency and atomicity, and improves the previous network structure approach discussed with reference to FIG. 2B. A SLA may be a part of a standardized service contract where a service is formally defined. Each node 110 may have more than one replica node 110b, and the replica nodes 110b may be determined or assigned based on workload characteristics and the SLA (e.g., based on how much a corresponding client or customer pays, as preferential treatment may be purchased, and based on a corresponding workload temperature). Table 2 shows a decision table for different cases, which may be used to set up the cluster multiple-SLA network approach, according to an example of an embodiment of the present invention.

TABLE 2

|        | SLA    |             | Trace       |            |            |         | # of    |
|        |        |             | Destination |            |            |         |         |
| Case # | Degree | Temperature | $SSD_P$     | $SSD_{R1}$ | $SSD_{R2}$ | $HDD_P$ | Replica |
| 1      |        | ✓           | ✓           | ✓          |            |         | 1       |
| 2      |        | ✓           | ✓           |            | ✓          |         | 1       |
| 3      | ✓      | ✓           | ✓           | ✓          | (✓)        |         | 1(2)    |
| 4      | ✓      |             | ✓           | ✓          |            | (✓)     | 1(2)    |

A SLA degree may be related by assigning a level of importance of each node 110. The present embodiment can handle multiple SLA levels by using multiple replica approaches. The present example has only two degrees (e.g., important and not important). In other embodiments, more fine-grained degrees of SLAs may be set. Moreover, an online-changing SLA can also be adopted into embodiments of the present invention.

Additionally, "data temperature" may be used as an indicator for classifying data into two (or more) categories based on the access frequency of the data (e.g., "hot data" has a frequent access pattern, and "cold data" is occasionally queried).

A write back policy may be used such that eviction from one SSD 140a to another SSD 140a when the SSD 140a is full allows for the data to be simply removed. To avoid affecting write-backs from a SSD 140a to a HDD 140b, and to avoid affecting fetching operations from a HDD 140b to a SSD 140a, a lower priority may be established for replicas writing to the HDD. Many techniques may be adopted to improve performance of a write-to-HDD queue.

A main procedure of a cache policy may be based on the multiple-SLA network approach. As discussed above, the present embodiment may support more than one replica node 110b for each primary node 110a, and the present embodiment may be expanded to any number of replica nodes 110b to support more finely grained SLAs. Accordingly, the present embodiment is able to switch between two different cache modes, namely a runtime mode and an online migration mode.

The datacenter cluster 100 may periodically check for the existence of a "migration trigger" condition. If it is determined that the "migration trigger" condition exists, one of the two replica nodes 100b is selected as an "overheat node," and a next available replica node 110b is sought. After that, a migration mode cache policy may be initiated. If it is determined that an old replica node 110b no longer has any "out-of-date" replica data, then the migration mode cache policy may be turned off, while the runtime mode cache policy is run in all other cases.

In case #s 3 and 4 of Table 2, above, it may be assumed that crashes/failures of VMs 120 mainly affect cached data on the SSDs 140a, and do not affect data on the HDD 140b. In the cache policy of the present embodiment, there are only three cases where the cached data is written to the HDD 140b (e.g., during eviction write back, during migration time, and when the queued replica is written to HDD 140b).

A runtime mode cache policy may be thought of as a normal mode, or a default mode, of the datacenter cluster 100. The present embodiment may first search a new I/O request in a local SSD VM partition (e.g., in the SSD 140a of the primary node 110a). If it is determined that a cache hit is returned, the data may be fetched from the SSD 140a of the primary node 110a for a read I/O operation, or the new data may be updated to existing cached copies in the SSD 140a of the primary node 110a and to one or more replica nodes 110b.

When it is determined that there is a cache miss, victim data may initially be selected to be evicted from the primary node 110a and from the replica nodes 110b. Then, only updated (dirty) data may be written into the HDD 140b of the primary node 110a. Different replacement algorithms may be used for implementation of the victim data selection process. The selected victim data may then be written back to the HDD 140b of the primary node 110a if the victim data is determined to be dirty. That is, the victim data may be updated in the SSD 140a while not being updated in the HDD 140b. Thereafter, all copies of the victim data may be deleted from both local SSDs 140a and remote SSDs 140a. Then the new data may be inserted into both the primary node 110a and the replica node(s) 110b.

In detail, if the victim data corresponds to a read I/O operation, then the victim data may simply be fetched from the HDD 140b to the SSDs 140a of the primary node 110a and the replica nodes 110b. Additionally, the fetched cached data may be returned to a user buffer in the memory. If the victim data corresponds to a write I/O operation, the victim data may simply be written to the SSDs 140a of the primary node 110a, and also to all corresponding replica nodes 110b, while being flagged as being "dirty" data, because the data is updated new data.

Figure 3:
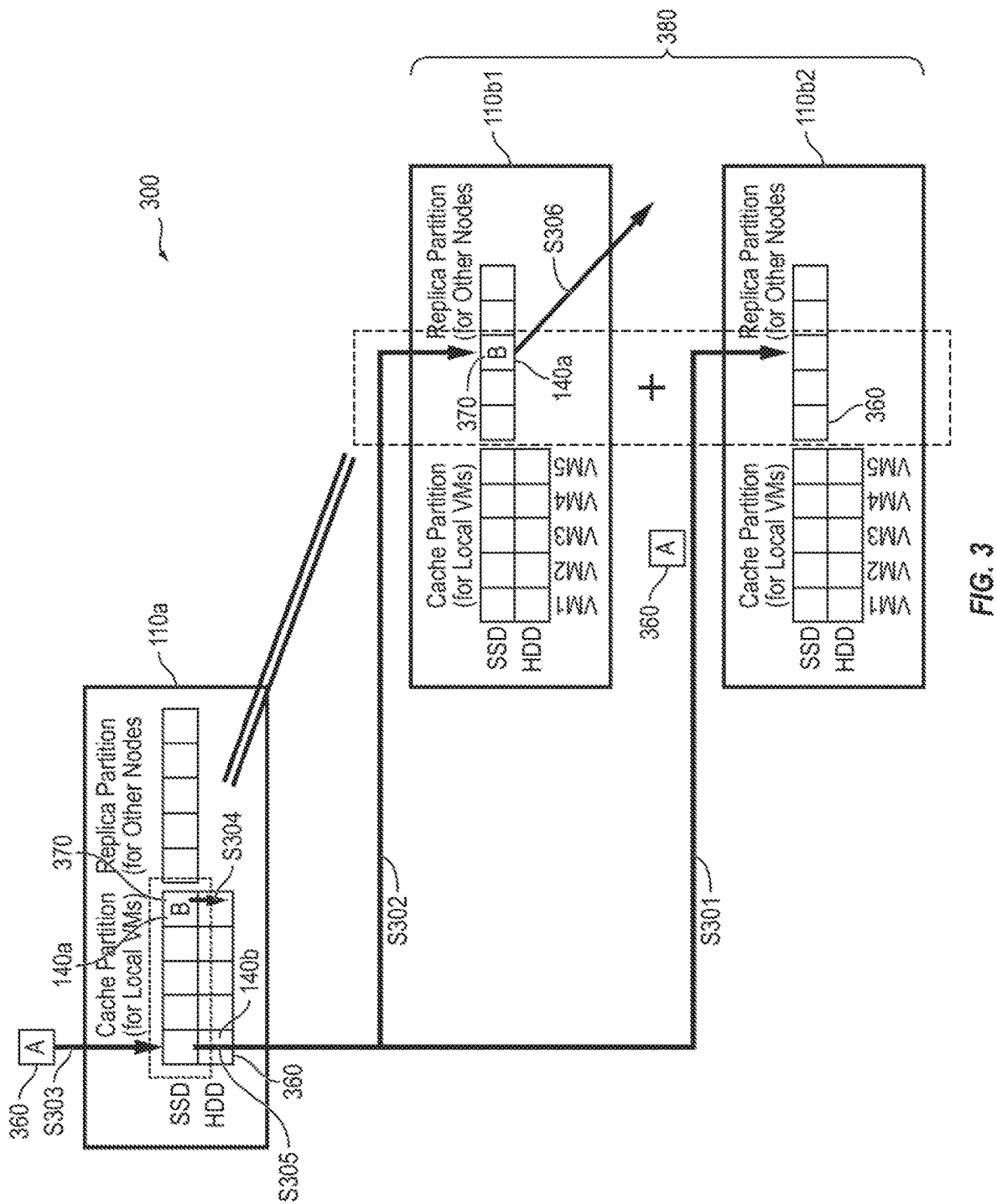
FIG. 3 is a block diagram depicting an online migration cache policy, according to an embodiment of the present invention.

FIG. 3 is a block diagram depicting an online migration cache policy, according to an embodiment of the present invention.

Referring to FIG. 3, when migrating replica data from one replica node 110b to another replica node 110b, a fusion cache technique 300 may be used. The fusion cache technique 300 is a cost-efficient, lazy migration scheme. Accordingly, new incoming data 360 may be written only on a new replica node (e.g., a second replica node) 110b2 (S301), and unchanged cached data/victim data 370 may be kept on an old replica node (e.g., a first replica node) 110b1 (S302). Accordingly, the present embodiment is able to mirror the primary node 110a by using a fusion cache 380 consisting of two nodes (e.g., the new replica node 110b2 and the old replica node 110b1). By not pausing the system while performing the copying of all existing replica data pieces from the old replica node 110b1 to the new replica node 110b2 (regardless of whether these data pieces are needed), the proposed fusion cache can save system bandwidth.

FIG. 3 shows that only one replica node (e.g., the old replica node 110b1) is to be "migrated out" with the new replica node 110b2 receiving the data 370 that is migrated out, although the present embodiment may be applied to a system/datacenter cluster 100 in which more replica nodes 110b exist, including use of a HDD 140b in a replica node 110b. The primary node 110a may migrate its existing data piece/victim data 370 to a new replica node 110b2. When new data 360 comes to the primary node 110a (S303), victim data 370 may first be evicted from the SSD 140a of the primary node 110a (S304), and the new data 360 may be written to the HDD 140b of the primary node 110a (S305). Meanwhile, the new data 360 may also be written to the new replica node 110b2 (S301), and the old replica node 110b1 may be instructed to simply remove the victim data 370 from its SSD 140a (S306). The fusion cache 380 is a unibody of the new replica node 110b1, and the old replica node 110b2 is a mirror of the primary node 110a, where the new replica node 110b1 eventually replaces the old replica node 110b2.

By using the online migration mode cache policy 300, data is able to be migrated from the old replica node 110b2 to the new replica node 110b1, while a remaining replica node 110b may remain as a replica node 110b that is used by the primary node 110a (along with the new replica node 110b1). For a two-SSD-replica node prototype, both replica nodes 110b1 and 110b2 can be the migration sources.

FIGS. 4A-4D are block diagrams depicting data recovery for different scenarios, according to one or more embodiments of the present invention.

Embodiments of the present invention may use a write back caching policy to maximize I/O performance, as writing through to the HDD 140b would otherwise slow down the fetching I/O operations in the queue. However, storage in the SSD 140a may be relatively unsafe, even though SSD storage preserves stored data after losing power. Such a lack of safety may not acceptable in some situations (e.g., bank databases, stock market databases, and military databases). Accordingly, data may be replicated in remote SSDs 140$a$ to prepare for recoveries for different failures. The possible types of failures may be categorized into the four scenarios discussed with respect to FIGS. 4A-4D, respectively.

Figure 4A:
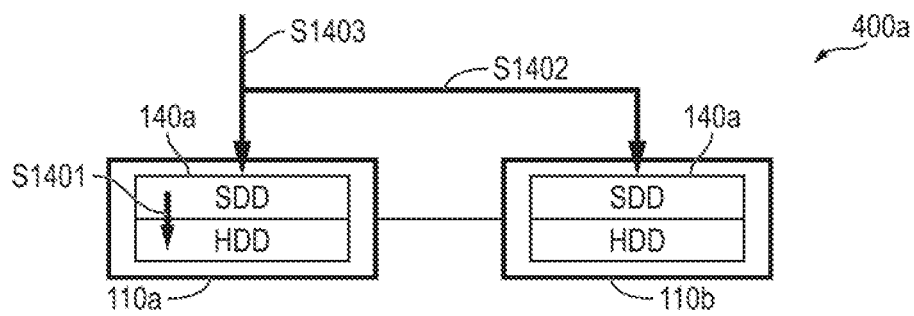
FIGS. 4A-4D are block diagrams depicting data recovery for different scenarios, according to one or more embodiments of the present invention.

Referring to FIG. 4A, a first recovery scenario may be referred to as a "VM crash on the primary node" scenario 400$a$. In the present scenario 400$a$, the VMDK may simply be closed out. Then, the "dirty" data may be written back from the SSD 140$a$ of the primary node 110$a$ to the HDD 140$b$ of the primary node 110$a$ (S1401). The dirty data may be kept in the SSD 140$a$ of the replica node 110$b$ while being flagged as "nondirty" (S1402). The crashed VM may then be restarted on the primary node 110$a$, and incoming I/O requests may continue to be forwarded to both the SSD 140$a$ of the primary node 110$a$ and the SSD 140$a$ of the replica node 110$b$ (S1403).

Figure 4B:
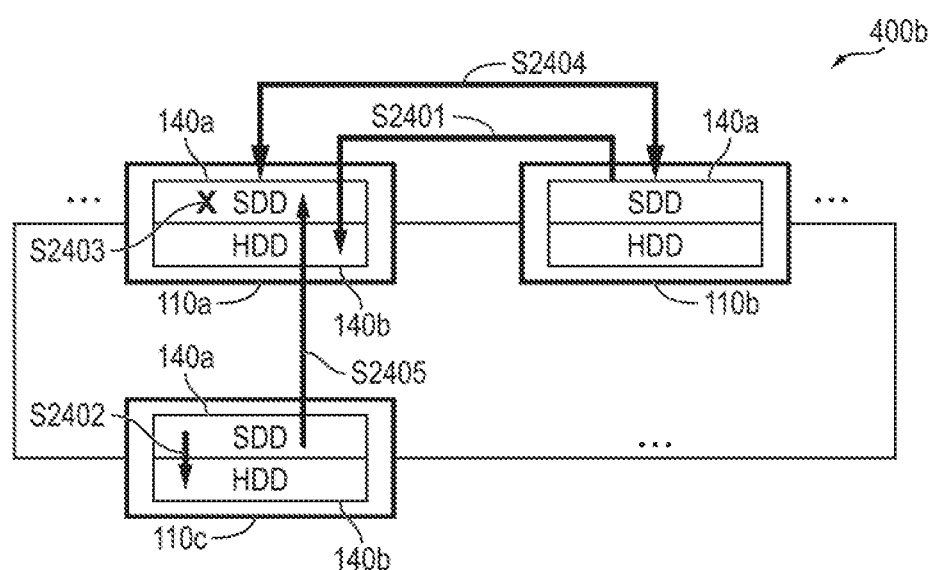

Referring to FIG. 4B, a second recovery scenario may be referred to as a "primary node cache storage device failure" scenario 400$b$, which will result in an inability to continue write caching. In the present scenario 400$b$, the "dirty" data is first written back from the SSD 140$a$ of the replica node 110$b$ to the HDD 140$b$ of the primary node 110$a$ (S2401), and the data is kept in the SSD 140$a$ of the replica node 1108 while being flagged as "nondirty." This "unavailable" information is then broadcast to the datacenter cluster 100 to let those nodes 110 having replicas in this failed primary node 110$a$ (e.g., associated nodes 110$c$) to write back "dirty" data from their own SSD 140$a$ to HDD 140$b$ while keeping the data in their own SSD 140$a$ with a "nondirty" flag (S2402). The SSD 140$a$ on primary node 110 is then found and replaced (S2403). After that, incoming I/O requests continue to be written on both of the SSD 140$a$ of the primary node 110$a$ and the SSD 140$a$ of the replica node 110$b$ (S2404), while the associated nodes 110$c$ write new replicas to the SSD 140$a$ of the primary node 110$a$ (S2405).

Figure 4C:
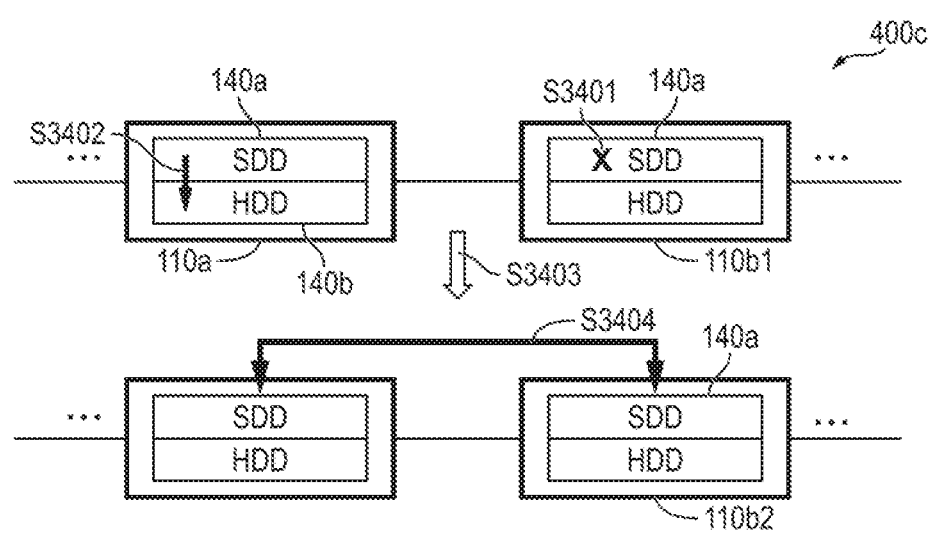

Referring to FIG. 4C, a third recovery scenario 400$c$ corresponds to when an old replica node 110$b1$ detects a cache device/SSD 140$a$ failure (S3401). In the present example, the primary node 110$a$ is disconnected, and any future connection attempts from the primary node 110$a$ are rejected by an error response. First, the "dirty" data is written back from the SSD 140$a$ of the primary node 110$a$ to the HDD 140$b$ of the primary node 110$a$ (S3402). That data is also stored, while being flagged as "nondirty" flag data, in the SSD 140$a$ of a remote new replica node 110$b2$, which may be found using a dynamic evaluation process (S3403). Thereafter, incoming I/O requests continue to be written on both the SSD 140$a$ of the primary node 110$a$ and the SSD 140$a$ of the new replica node 110$b2$ (S3404).

Figure 4D:
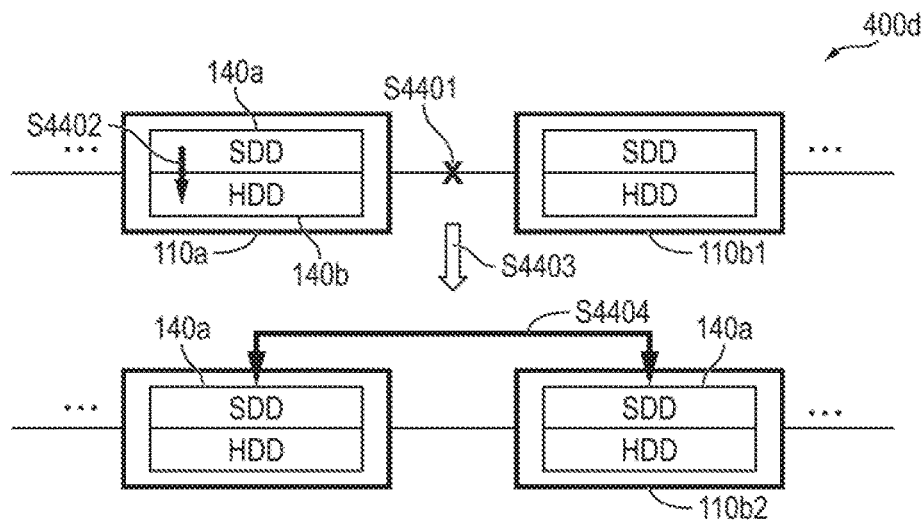

Referring to FIG. 4D, a fourth recovery scenario 400$d$ corresponds to a communication failure between a primary node 110$a$ and an old replica node 110$b1$. When the primary node 110$a$ detects a non-recoverable communication failure between the primary host of the primary node 110$a$ and the replica host of the replica node 110$b1$ (S4401), it may not be possible to continue write caching. To recover from such failure, a daemon of the datacenter cluster 100 may write back "dirty" data from the SSD 140$a$ of the primary node 110$a$ to the HDD 140$b$ of the primary node 110$a$ to ensure all cached data is updated to the back end HDD 140$b$ (S4402). Then the daemon may start a dynamic evaluation process to find a new replica host, and to find a new replica node 110$b2$ to replace the unreachable old replica node 110$b1$ (S4403). The daemon then continues to use the SSDs 140$a$ of both the primary node 110$a$ and the new replica node 110$b2$ to cache I/Os following the "fusion cache" design in migration policy (S4404). Finally, the daemon may broadcast to the network to release all old replicas on the unreachable the SSD 140$a$ of the replica node 110$b1$.

Figure 5:
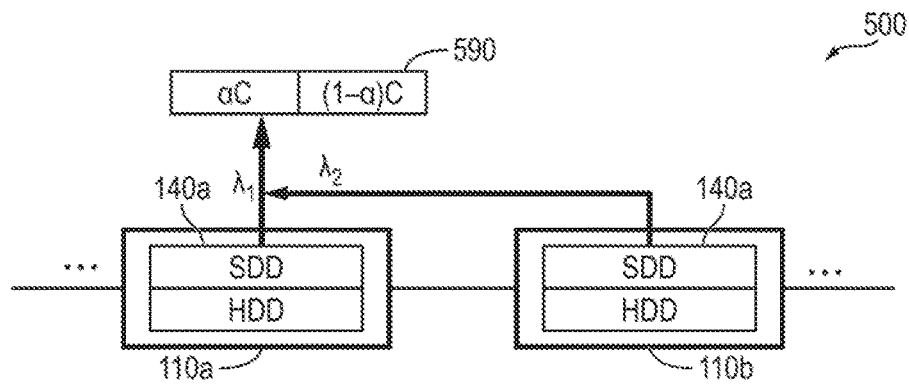
FIG. 5 is a block diagram depicting an example of using replicate data to enable parallel prefetching from multiple nodes, according to an embodiment of the present invention.

FIG. 5 is a block diagram depicting an example of using replicate data to enable parallel prefetching from multiple nodes, according to an embodiment of the present invention.

Referring to FIG. 5, replicated data can also be used to enable parallel prefetching 500 from multiple nodes 110, such as for read operations. In the present example, the data (e.g., data of a dataset) 590 is split into two parts 590$a$ and 590$b$, and each part of the data 590 is loaded from its corresponding primary node 110$a$ and replica node 110$b$.

For example, for a two-node case, it may be useful to reduce the total I/O time (e.g., the makespan of each I/O request). The makespan of parallel prefetching 500 is less than simply reading an entire piece of data from the primary node 110$a$. In the present example, a total size of the data 590 is "C," the access speed of the SSD 140$a$ of the primary node 110$a$ is "$\lambda_1$" (e.g., in GB/sec), and the access speed of the SSD 140$a$ of the replica node 110$b$, while accounting for network delays, is "$\lambda_2$" (e.g., in GB/sec). Assuming data of the SSD 140$a$ of the primary node 110$a$ having a size of "$\alpha C$" is loaded, the problem may be solved by determining a maximum between $\alpha C/\lambda_1$ and $(1-\alpha)C/\lambda_2$, where a is between 0 and 1, and where $\lambda_1 \geq \lambda_2 > 0$, and where $C/\lambda_1 \geq$ the maximum between $\alpha C/\lambda_1$ and $(1-\alpha)C/\lambda_2$.

Determining the maximum between $\alpha C/\lambda_1$ and $(1-\alpha)C/\lambda_2$ shows an objective function for reducing, or minimizing, an overall makespan of an I/O request. This makespan may be determined by the maximum value of the I/O operating time of each node involved in the parallel prefetching (e.g., the primary node and the replica node). Furthermore, by ensuring that $\lambda_1 \geq \lambda_2 > 0$, the local I/O speed (e.g., the speed associated with the primary node) is greater than the remote I/O speed (e.g., the speed associated with the replica node). The speeds associated with the respective nodes may account for, or may include, network delay. Alternatively, a constraint may simply be that $\lambda_1 > 0$ and that $\lambda_2 > 0$ (e.g., if the remote I/O speed associated with the replica node is higher than the I/O speed associated with the primary node, although an optimization result may remain the same. Additionally, by having $C/\lambda_1 \geq$ a maximum of $\alpha C/\lambda_1$ and $(1-\alpha)C/\lambda_2$, parallel prefetching may only be triggered when resulting in a reduction of the makespan.

Figure 6:
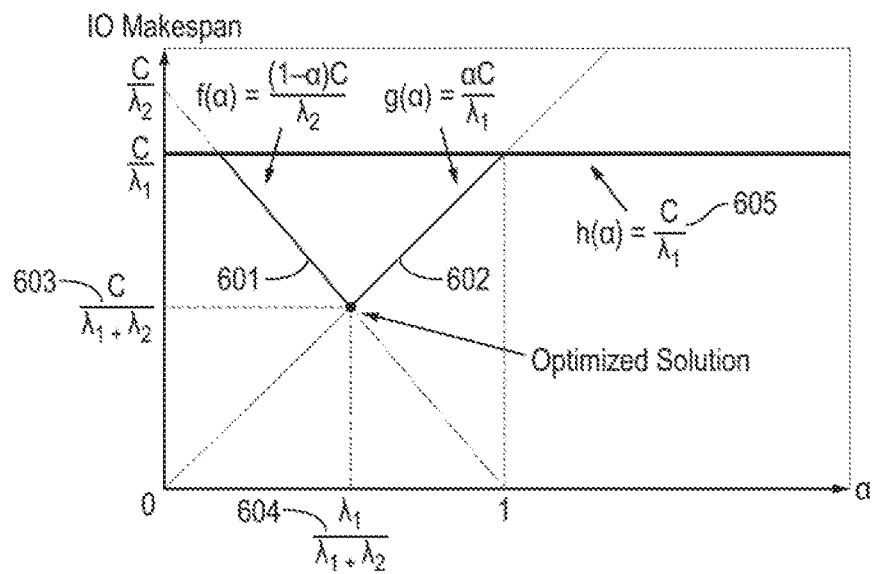
FIG. 6 is a graphical depiction of mathematical equations for finding an optimized solution of stream division, according to an embodiment of the present invention.

FIG. 6 is a graphical depiction of mathematical equations for finding an optimized solution of stream division, according to an embodiment of the present invention.

Referring to FIG. 6, the abovementioned functions, constrains, and equations may be graphically represented, where lines 601 and 602 represent an objective function curve, and where line 605 represents $C/\lambda_1$. As shown in FIG. 6, a minimum point occurs at a cross point of the line 601 and the line 602. Accordingly, the minimum point may be determined by setting $\alpha C/\lambda_1$ equal to $(1-\alpha)C/\lambda_2$. Thereafter, a minimal makespan may be determined as $C/(\lambda_1+\lambda_2)$ (i.e., line 603) when a is equal to $\lambda_1/(\lambda_1+\lambda_2)$ (i.e., line 604).

Accordingly, a parallel prefetching policy may be determined. In some embodiments of the present invention, a parallel fetching daemon may be used to trigger the parallel prefetching. The parallel fetching daemon may periodically check whether the access speed of the SSD of the replica node (including network delay) is approximately equal to the access speed of the local SSD of the primary node by comparing their difference with a preset threshold. The parallel fetching daemon may also check whether a current utilization ratio of throughput of the SSD of the replica node is less than a given operating threshold, and may approve/trigger parallel prefetching if all of these conditions are satisfied.

Furthermore, the parallel fetching daemon may calculate a branching ratio of data to be loaded from each node of a datacenter cluster, and may then assign the branching ratio to each node before beginning to read from the nodes. Accordingly, embodiments of the present invention may be further extended to a parallel fetching case involving more than two source nodes. Lastly, embodiments of the present invention may also work for parallel write operations with additional synchronization schemes.

Accordingly, the solutions provided by embodiments of the invention described above provide for a data replica manager designed for distributed caching, and data processing systems using SSD-HDD tier storage systems. The embodiments improve the ability of fault tolerance by storing caches in replica nodes to effectively recover from disasters while enhancing performance in the SSD space. Furthermore, the embodiments provide at least three approaches for selecting replica nodes and building a replica cluster architecture to support multiple SLAs, based on importance degree, workload temperature, and an abstract distance matrix, which considers network delay and storage access latency.

Embodiments of the present invention can also automatically perform load-balancing among nodes, and can conduct seamlessly online migration operation, as opposed to pausing the subsystem and copying the entire dataset from one node to the other. The described embodiments therefore improve fault tolerance ability for cluster caching systems, and enable successful recovery from four different failure scenarios. Embodiments of the present invention also allow for parallel prefetching from both primary node and replica node(s) with an optimized prefetching solution for each I/O path.

What is claimed is:

1. A method of data storage, the method comprising:
   determining a latency distance from a primary node to two or more replica nodes in a tier;
   choosing a preferred replica node of the two or more replica nodes based on the determined latency distances; and
   migrating replica data from a second replica node of the two or more replica nodes to the preferred replica node using a fusion cache method comprising:
      write-caching new data from the primary node to the preferred replica node;
      copying the replica data from the second replica node to the preferred replica node; and
      maintaining the replica data existing data on the second replica node, wherein the migration of the replica data from the second replica node to the preferred replica node is performed during operation of a system comprising the preferred replica node.

2. The method of claim 1, wherein the two or more replica nodes have a smaller latency distance to the primary node than all available nodes of a datacenter cluster comprising the primary node and the two or more replica nodes.

3. The method of claim 1, wherein one or more nodes of a datacenter cluster as a primary node has a ranking of preferred replica nodes that are ranked based on network delays associated with paths between the primary node and respective ones of the replica nodes, and
   wherein the one or more nodes of the datacenter cluster comprise:
      a solid-state drive tier as a cache tier comprising a cache partition for storing data of local virtual machines and a replica partition for storing replica data from other nodes; and
      a hard disk drive tier as a back end storage tier.

4. The method of claim 3, wherein the one or more nodes further comprise a physical host for running virtual machines, the virtual machines sharing the solid-state drive tier and the hard disk drive tier in a respective node of the datacenter cluster, the method further comprising periodically updating the ranking of the preferred replica nodes to account for changes in network delays.

5. The method of claim 3, wherein the ranking of the preferred replica nodes are further based on workload characteristics comprising access frequency of data associated with the preferred replica nodes and service level agreements (SLAs) associated with the preferred replica nodes.

6. A method of using replicated data to enable parallel prefetching from nodes of a datacenter cluster, the method comprising:
   splitting a dataset into two parts;
   loading the two parts of the dataset from corresponding nodes comprising a primary node of the datacenter cluster, and a replica node of the datacenter cluster;
   determining a difference between an access speed corresponding to the replica node and an access speed corresponding to the primary node exceeds a threshold, or determining a utilization ratio of throughput corresponding to the replica node is less than an operating threshold; and
   triggering parallel prefetching of the dataset from the primary node and the replica node, such that a makespan of the parallel prefetchinq is less than reading the two parts of the dataset from the primary node.

7. A method of using replicated data to enable parallel prefetching from multiple nodes of a datacenter cluster, the method comprising:
   splitting a dataset into two parts;
   loading the two parts of the dataset from corresponding nodes comprising a primary node of the datacenter cluster, and a replica node of the datacenter cluster;
   determining a difference between an access speed corresponding to the replica node and an access speed corresponding to the primary node exceeds a threshold, or determining a utilization ratio of throughput corresponding to the replica node is less than an operating threshold;
   determining a ratio of a total size of the dataset to an access speed of a solid-state drive of the primary node is greater than or equal to a maximum of a ratio of a size of a first of the two parts from the solid-state drive of the primary node to an access speed of the solid-state drive of the primary node and a ratio of a size of a second of the two parts from a solid-state drive of the replica node to an access speed of the solid-state drive of the replica node; and
   triggering parallel prefetching.

8. The method of claim 7, wherein $\lambda_1$ and $\lambda_2$ account for corresponding network delays of the datacenter cluster.

9. The method of claim 7, further comprising:
   determining a ratio of the access speed of the solid-state drive of the primary node to a sum of the access speed of the solid-state drive of the primary node and the access speed of the solid-state drive of the replica node; and
   achieving a network makespan equal to a ratio of the total size of the dataset to a sum of the access speed of the solid-state drive of the primary node and the access speed of the solid-state drive of the replica node.

\* \* \* \* \*

UNITED STATES PATENT AND TRADEMARK OFFICE
CERTIFICATE OF CORRECTION

PATENT NO. : 11,451,645 B2
APPLICATION NO. : 16/569176
DATED : September 20, 2022
INVENTOR(S) : Zhengyu Yang et al.

It is certified that error appears in the above-identified patent and that said Letters Patent is hereby corrected as shown below:

In the Claims
Column 13, Line 52, Claim 1    After "data" delete "existing data"

Signed and Sealed this
Twenty-seventh Day of June, 2023

Katherine Kelly Vidal
*Director of the United States Patent and Trademark Office*